United States Patent Office 3,408,423
Patented Oct. 29, 1968

3,408,423
UNSATURATED PERESTER CATALYSTS FOR POLYESTER POLYMERIZATION
Ronald L. Friedman, San Rafael, and Ronald L. Pastorino, Oakland, Calif., assignors to Argus Chemical Corporation, a corporation of Delaware
No Drawing. Filed July 21, 1966, Ser. No. 566,722
3 Claims. (Cl. 260—872)

ABSTRACT OF THE DISCLOSURE

Tertiary butyl per crotonate is used to initiate the polymerization of polyester resins at elevated temperatures. Unexpectedly fast gel and peak temperature times at high peak temperatures are obtained.

---

This invention relates to the polymerization of polyester resins. In a preferred embodiment, the invention is concerned with the use of certain unsaturated monoperesters as initiators or catalysts for the polyester resin, especially when the resin is cured in a high temperature molding operation.

A number of properties are required for a catalyst to meet with industrial approval in the polyester field. In the usual situation, polyester in monomer or partially cured form is employed in a preliminarily formulated condition, such as a prepreg mat comprising a reinforcing entity such as glass fibers, and into which the polyester resin mass is incorporated. In the various prepreg and pre-mixed formulations utilized in the industry, the catalyst or initiator is included and distributed throughout the resin. As a result, the catalyst employed must be of the type that has a relatively long shelf life or pot life at ambient temperatures. In other words, it is essential that the resinous mass not be catalyzed and fully cured until the manufacturer has placed it into an appropriate form or mold.

In most instances, the polyesters are utilized in high temperature molding operations. In such environments the operating temperature is on the order of about 200–400° F,. commonly about 250–350° F. The catalyst therefore must be of the type that becomes reactive and initiates the polymerization in this temperature range. One of the most common catalysts heretofore utilized in this environment is tertiary butyl per benzoate.

In accordance with the present invention, it has been discovered that the polymerization of polyester resins can be improved by using a tertiary alkyl per alkylenate in place of the previously used organic peroxides, such as tertiary butyl per benzoate. In the present process, the tertiary alkyl per alkylenates provide significant advantages in a number of respects. Included in these advantages is improved color in the cured end resin product. Improvement in color may involve an absence of discoloration which frequently occurs with the previously employed catalysts. Another important advantage is an increase in the hardness of the cured polyester resin end product. Perhaps of most importance, especially from a practical commercial standpoint, the presently utilized catalysts in a polyester molding environment are substantially more efficient than previously used catalysts. Stated in one manner, they have been demonstrated to provide a given amount of activity with smaller quantities of catalyst after consideration is given to differences in molecular weight and theoretical active oxygen content. This point will be demonstrated in the example to follow hereinafter.

Aside from the catalyst used, the present process is consistent with prior polyester processing. All of the common polyester monomers, cross-linking agents, reinforcing materials, and partially cured mixes can be utilized and the catalyst preliminarily blended with the mass. In general, since the catalyst is very efficient, smaller quantities may be utilized than previously used with the same resins. A typical useful range for present purposes is about .1–5% by weight of catalyst to resin content. At a time convenient to the manufacturer, the preblended resin-catalyst mass is cured with application of temperature and pressure. Again, the conditions are substantially unchanged from prior practice.

As noted, the present improvements are achieved with the use of a tertiary alkyl per alkylenate, preferably where the molecule contains up to about 20 carbon atoms. In most cases, the portion of the ester molecule derived from the alcoholic (hydroperoxide) reactant, i.e., the tertiary alkyl group, will be a tertiary butyl group because of availability of the requisite starting reactants. However, a tertiary amyl group, for example, would provide the same results.

The portion of the ester molecule derived from the acid or acid halide utilized in the esterification contains olefinic unsaturation and will generally contain up to about 11 or 12 carbon atoms. Preferred catalysts for the present process include tertiary butyl per acrylate, tertiary butyl per methacrylate, tertiary butyl per crotonate, and tertiary butyl per undecylenate.

The peresters of this invention are well known and may be prepared by any of the conventional techniques. As an example, tertiary butyl per crotonate may be prepared as follows:

Preparation of tertiary butyl per crotonate

A mixture of 250 milliliters of water and 1.13 moles of 50% sodium hydroxide was cooled to 10° C. 0.50 mole of t-butyl hydroperoxide was added to the stirred caustic solution; the mixture was then cooled to 0° C. and Triton X–100 and petroleum naphthalene added to the reactant. Thereafter, 0.75 mole of crotonoyl chloride was added over 30 minutes at 0 to 2.5° C. The mixture was stirred for another two hours at these temperatures, and after the reaction was complete was phase separated. The organic layer was washed twice with cold dilute KOH solution (pH 11), twice with cold water, once with dilute cold sulfuric acid solution (pH 1), and once more with cold water. The washes were all carried out at 10–15° C. with 15 minutes of stirring. The product was dried with anhydrous sodium sulfate, filtered and concentrated under vacuum. The product analysis was as follows:

Active oxygen:
    Theoretical—10.11
    Actual—9.60
    Purity of final product—94.7%
    Yield percent of theory—74.9

To demonstrate the improvements of the present invention, efficiency of the catalyst in the polyester polymerization was selected as a property which best illustrates the point. For comparative purposes, one of the most prevalent catalysts being used in the polyester field, tertiary butyl per benzoate, was selected. A series of tests utilizing the Society of Plastics Industry Standard Polyester Gel Test was conducted. In this test, 100 grams of a polyester resin and the selected amount of catalyst, such as 1 gram for a 1% test, are blended and placed in an oil bath maintained at constant temperature. Time to gel point, time to peak temperature, and the peak temperature were then recorded.

To make a fair comparison, the differences in active oxygen content of tertiary butyl per benzoate and a catalyst of the present process was considered. A typical catalyst for the present process is tertiary butyl per crotonate. The theoretical active oxygen content of tertiary butyl per benzoate is 8.24%, whereas the theoretical active oxygen content of tertiary butyl per crotonate is 10.1%. Therefore, comparable results should be expected where 1% of tertiary butyl per benzoate is used as a catalyst and only .8% of tertiary butyl per crotonate is used. As will be shown, considerably less than .8% of tertiary butyl per crotonate was required to produce comparable results in a catalyzed polyester as compared with the same polyester utilizing 1% of tertiary butyl per benzoate. In this way the greater efficiency of the catalysts in the new process was substantiated.

The following table contains the results of the Society of Plastics Industry test where the oil bath was maintained at a constant temperature of 250° F. The first column lists the different polyesters which were compared. The second column indicates performance of a 1% tertiary butyl per benzoate catalyst. The third and fourth columns list the performance of tertiary butyl per crotonate and the amount of the per crotonate that was utilized for comparison with the 1% of the per benzoate.

In order to determine precisely how much of the per crotonate should be utilized to equal the performance of 1% of the per benzoate, curves were prepared for each resin system. Column 5 represents the calculated amount of the per crotonate which would have given precisely the same performance as the 1% of per benzoate if it had been utilized.

per crotonate. Storage was effected at 80° F. In all cases, the pot life was in excess of 20 days.

In comparable experiments, similar performance as to efficiency, pot life, and other advantages is observed with tertiary butyl per acrylate, tertiary butyl per methacrylate, and tertiary butyl per undecylenate.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved process for initiating the polymerization of polyester resins comprising: incorporating a catalytic amount of tertiary butyl per crotonate in a polymerizable polyester resin and subjecting the combination to temperature and pressure polymerization conditions.

2. An improved process in accordance with claim 1 wherein said tertiary butyl per crotonate is incorporated into said resin in an amount of about .1–5% by weight of said resin.

3. An improved process in accordance with claim 1 wherein the temperature of said polymerization conditions is about 200–400° F.

| Polyester Resin | Performance of 1% Tertiary Butyl Per Benzoate | Performance of Tertiary Butyl Per Crotonate | | |
|---|---|---|---|---|
| | | Observed | Actual Amount Used, Percent | Amount Equivalent to Performance of 1% Tertiary Butyl Per Benzoate, Percent |
| Plaskon 942, Allied Chemical Co. | Gel, 2'38"<br>Peak Time, 3'10"<br>Peak Temp., 388° | 2'35"<br>3'09"<br>383° | 0.75 | 0.74 |
| Plaskon PE 464, Allied Chemical Co. | Gel, 2'40"<br>Peak Time, 3'07"<br>Peak Temp., 366° | 2'18"<br>2'44"<br>376° | 0.50 | 0.40 |
| Koplac 3800-25, Koppers Chemical Co. | Gel, 2'34"<br>Peak Time, 3'01"<br>Peak Temp., 374° | 2'31"<br>3'00"<br>374° | 0.75 | 0.73 |
| Koplac 6101-25, Koppers Chemical Co. | Gel, 2'45"<br>Peak, Time, 3'20"<br>Peak Temp., 375° | 2'47"<br>3'27"<br>383° | 0.40 | 0.42 |
| Hetron 92, Hooker Chemical Co. | Gel, 2'50"<br>Peak Time, 3'23"<br>Peak Temp., 368° | 2'42"<br>3'15"<br>369° | 0.50 | 0.45 |
| Hetron 103, Hooker Chemical Co. | Gel, 2'23"<br>Peak Time, 3'07"<br>Peak Temp., 376° | 2'24"<br>3'09"<br>372° | 0.50 | 0.50 |
| Stypol 40-2666, Freeman Chemical Co. | Gel, 2'46"<br>Peak Time, 3'23"<br>Peak Temp., 375° | 2'50"<br>3'27"<br>376° | 0.50 | 0.52 |
| Aropol 7410M, Archer-Daniels Midland Co. | Gel, 2'22"<br>Peak Time, 2'56"<br>Peak Temp., 361° | 2'29"<br>3'04"<br>367° | 0.75 | 0.82 |
| Marco MR-4712, Marco Chemical Div. of W. R. Grace | Gel, 2'10"<br>Peak Time, 2'38"<br>Peak Temp., 370° | 2'14"<br>2'48"<br>369° | 0.50 | 0.55 |

Despite the significantly enhanced efficiency of the present catalyst system, there has been no sacrifice in stability and pot life of the catalyst when premixed with the polyester resin. A plurality of mixes of catalyst with four of the resins from the above table, namely Koplac 3800-25, Stypol 40-2666, Marco MR-4712, and Plaskon 942 were made up separately with one group of samples containing 1% of tertiary butyl per benzoate and the other group of samples containing 1% of tertiary butyl

References Cited

Kolczynski et al., ACS meeting, 1963, pp. 101–108.
Mageli et al., Modern Plastics, March 1959, pp. 135–137, 140, 144 and 172.
Milas et al., JACS, vol. 68, 1946, p. 642.
Rybolt et al., Modern Plastics, April 1959, pp. 101–103, 150, 152, 154, 157.

MURRAY TILLMAN, *Primary Examiner.*

J. T. GOOLKASIAN, *Assistant Examiner.*